US008700446B2

(12) United States Patent
Kiefer

(10) Patent No.: US 8,700,446 B2
(45) Date of Patent: Apr. 15, 2014

(54) METHODS AND SYSTEMS FOR DYNAMICALLY GENERATING COUPONS ASSOCIATED WITH PRESENTATION INSTRUMENTS

(75) Inventor: Stuart Kiefer, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 946 days.

(21) Appl. No.: 12/057,759

(22) Filed: Mar. 28, 2008

(65) Prior Publication Data

US 2009/0248483 A1   Oct. 1, 2009

(51) Int. Cl.
*G06Q 30/00* (2012.01)
(52) U.S. Cl.
CPC ..................................... *G06Q 30/00* (2013.01)
USPC ............................................................ 705/14
(58) Field of Classification Search
None
See application file for complete search history.

(56) References Cited

U.S. PATENT DOCUMENTS

| | | | |
|---|---|---|---|
| 4,528,643 A | 7/1985 | Freeny, Jr. |
| 4,700,055 A | 10/1987 | Kashkashian, Jr. |
| 4,829,168 A | 5/1989 | Nakahara |
| 4,884,212 A | 11/1989 | Stutsman |
| 5,146,067 A | 9/1992 | Sloan et al. |
| 5,220,501 A | 6/1993 | Lawlor et al. |
| 5,255,182 A | 10/1993 | Adams |
| 5,352,876 A | 10/1994 | Watanabe et al. |
| 5,440,108 A | 8/1995 | Tran et al. |
| 5,471,669 A | 11/1995 | Lidman |
| 5,477,038 A | 12/1995 | Levine et al. |
| 5,504,808 A | 4/1996 | Hamrick, Jr. |
| 5,511,114 A | 4/1996 | Stimson |
| 5,513,117 A | 4/1996 | Small |
| 5,557,516 A | 9/1996 | Hogan |
| 5,592,400 A | 1/1997 | Sasou |
| 5,637,845 A | 6/1997 | Kolls |
| 5,678,010 A | 10/1997 | Pittenger et al. |
| 5,720,158 A | 2/1998 | Goade, Sr. |
| 5,721,768 A | 2/1998 | Stimson et al. |

(Continued)

FOREIGN PATENT DOCUMENTS

| | | |
|---|---|---|
| CA | 2300241 | 9/2000 |
| JP | 2001-256388 A | 9/2001 |

(Continued)

OTHER PUBLICATIONS

PCT International Search Report and Written Opinion mailed Oct. 28, 2009; International Application No. PCT/US2009/037547, 14 pages.

(Continued)

*Primary Examiner* — Bruce I Ebersman
(74) *Attorney, Agent, or Firm* — Kilpatrick Townsend & Stockton LLP

(57) ABSTRACT

This disclosure describes, generally, methods and systems for dynamically generating coupons. The method may include associating a coupon value with a manufacturer's offer onto a presentation instrument. The presentation instrument may include a barcode to store terms of the manufacturer's offer and a storage device to store coupon value information. The method may further include distributing the presentation instrument to a customer, scanning the barcode to verify the terms of the offer have been fulfilled, and presenting the presentation instrument to a merchant to access the coupon value information stored on the storage device. Furthermore, the method includes receiving funds in the amount of the coupon value from the manufacturer, and transferring the received funds to the merchant.

9 Claims, 6 Drawing Sheets

(56) References Cited

U.S. PATENT DOCUMENTS

| | | |
|---|---|---|
| D396,882 S | 8/1998 | Neal, Jr. |
| 5,796,832 A | 8/1998 | Kawan |
| 5,844,221 A | 12/1998 | Madigan, Jr. et al. |
| 5,868,236 A | 2/1999 | Rademacher |
| 5,903,633 A | 5/1999 | Lorsch |
| 5,918,909 A | 7/1999 | Fiala et al. |
| 5,921,584 A | 7/1999 | Goade, Sr. |
| 5,936,221 A | 8/1999 | Corder et al. |
| 5,983,003 A | 11/1999 | Lection et al. |
| 5,984,181 A | 11/1999 | Kreft |
| 5,987,438 A | 11/1999 | Nakano et al. |
| 5,991,413 A | 11/1999 | Arditti et al. |
| 5,991,748 A | 11/1999 | Taskett |
| 6,006,988 A | 12/1999 | Behrmann et al. |
| D429,733 S | 8/2000 | Jones et al. |
| 6,129,275 A | 10/2000 | Urquhart et al. |
| D436,991 S | 1/2001 | Morgante |
| 6,169,975 B1 | 1/2001 | White et al. |
| 6,193,155 B1 | 2/2001 | Walker et al. |
| 6,295,522 B1 | 9/2001 | Boesch |
| 6,298,336 B1 | 10/2001 | Davis et al. |
| 6,370,514 B1 | 4/2002 | Messner |
| D457,556 S | 5/2002 | Hochschild |
| 6,386,457 B1 | 5/2002 | Sorie |
| 6,405,182 B1 | 6/2002 | Cuervo |
| 6,471,127 B2 | 10/2002 | Pentz et al. |
| 6,473,500 B1 | 10/2002 | Risafi et al. |
| 6,510,983 B2 | 1/2003 | Horowitz et al. |
| 6,543,809 B1 | 4/2003 | Kistner et al. |
| 6,568,599 B2 * | 5/2003 | Lahey et al. .............. 235/487 |
| 6,588,658 B1 | 7/2003 | Blank |
| 6,670,569 B2 | 12/2003 | Smith et al. |
| 6,766,301 B1 * | 7/2004 | Daniel et al. ............. 705/14.26 |
| 6,877,656 B1 | 4/2005 | Jaros et al. |
| 6,999,569 B2 | 2/2006 | Risafi et al. |
| 7,004,398 B1 | 2/2006 | Francis et al. |
| 7,303,121 B2 | 12/2007 | Martinez |
| 7,739,162 B1 * | 6/2010 | Pettay et al. .................... 705/35 |
| 2001/0018660 A1 | 8/2001 | Sehr |
| 2001/0023409 A1 | 9/2001 | Keil |
| 2001/0023415 A1 | 9/2001 | Keil |
| 2001/0047342 A1 | 11/2001 | Cuervo |
| 2002/0027837 A1 | 3/2002 | Weber |
| 2002/0161632 A1 | 10/2002 | Hagen et al. |
| 2002/0174016 A1 | 11/2002 | Cuervo |
| 2002/0185543 A1 | 12/2002 | Pentz et al. |
| 2003/0001005 A1 | 1/2003 | Risafi et al. |
| 2003/0010829 A1 | 1/2003 | Krygler |
| 2003/0048888 A1 | 3/2003 | Hopper et al. |
| 2003/0053609 A1 | 3/2003 | Risafi et al. |
| 2003/0088552 A1 | 5/2003 | Bennett et al. |
| 2003/0103644 A1 * | 6/2003 | Klayh ....................... 382/100 |
| 2004/0054575 A1 * | 3/2004 | Marshall ........................ 705/14 |
| 2004/0117327 A1 | 6/2004 | Smith et al. |
| 2004/0155783 A1 * | 8/2004 | Al-Sheikh .................... 340/584 |
| 2005/0027655 A1 | 2/2005 | Sharma et al. |
| 2005/0065877 A1 | 3/2005 | Cleary et al. |
| 2005/0137916 A1 * | 6/2005 | McElhannon ................... 705/5 |
| 2005/0165784 A1 * | 7/2005 | Gomez et al. ................... 707/9 |
| 2005/0177423 A1 | 8/2005 | Swanson |
| 2005/0230473 A1 * | 10/2005 | Fajkowski .................. 235/383 |
| 2005/0240478 A1 * | 10/2005 | Lubow et al. ................. 705/14 |
| 2005/0246230 A1 | 11/2005 | Murray |
| 2006/0065748 A1 | 3/2006 | Halbur et al. |
| 2006/0091202 A1 * | 5/2006 | McInnis ....................... 235/381 |
| 2006/0190337 A1 | 8/2006 | Ayers et al. |
| 2006/0218038 A1 * | 9/2006 | Grider ........................... 705/14 |
| 2007/0015587 A1 * | 1/2007 | Glisson et al. ................ 463/42 |
| 2007/0034689 A1 | 2/2007 | Jaros et al. |
| 2007/0288503 A1 * | 12/2007 | Taylor ........................ 707/102 |
| 2008/0010114 A1 * | 1/2008 | Head ............................. 705/14 |
| 2008/0077488 A1 * | 3/2008 | Main et al. ..................... 705/14 |
| 2008/0120155 A1 * | 5/2008 | Pliha ................................ 705/7 |
| 2008/0249878 A1 * | 10/2008 | Fajkowski ...................... 705/14 |
| 2009/0222842 A1 * | 9/2009 | Narayanan et al. ........... 719/328 |

FOREIGN PATENT DOCUMENTS

| | | |
|---|---|---|
| JP | 2001-351001 A | 12/2001 |
| JP | 2002-189963 A | 7/2002 |
| KR | 10-2001-0102768 A | 11/2001 |
| KR | 10-2001-0102820 A | 11/2001 |
| WO | WO 2004/061736 A1 | 7/2004 |

OTHER PUBLICATIONS

Gold Box, Inc., "Charitygift—About Charitygift," http://www.charitygift.com/docs/about_us/about_us.jsp, 1 page, 2002.
Gold Box, Inc., "Charitygift—Generosity in a To-Go Box," http://www.charitygift.com/index.jsp, 2 pages, 2002.
Gold Box, Inc., "Charitygift—Gift Redemption," http://www.charitygift.com/redemption/EnterNumber.jsp, 1 page, 2002.
Gold Box, Inc., "Charitygift—How It Works," http://www.charitygift.com/docs/about_us/how_it_works.jsp, 1 page, 2002.
Gold Box, Inc., "Charitygift—Letter From Founder," http://www.charitygift.com/docs/about_us/letter.jsp, 3 pages, 2002.
Gold Box, Inc., "Charitygift—Products & Services," http://www.charitygift.com/docs/about_us/products.jsp, 3 pages, 2002.
Gold Box, Inc., "Charitygift—Questions and Answers," http://www.charitygift.com/docs/help/faq.jsp, 6 pages, 2002.
Gold Box, Inc., "Charitygift—Registry," http://www.charitygift.com/cg?pg=honr, 2 pages, 2002.
Gold Box, Inc., "Charitygift—What to Expect," http://www.charitygift.com/SelectCard?page.success=/cardshop/What-ToExpect.jps&canFla, 1 page, 2002.
U.S. Appl. No. 10/405,043, filed Mar. 31, 2003.
U.S. Appl. No. 10/688,065, filed Oct. 16, 2003.

* cited by examiner

METHODS AND SYSTEMS FOR DYNAMICALLY GENERATING COUPONS ASSOCIATED WITH PRESENTATION INSTRUMENTS

RELATED APPLICATION

The instant application is related to U.S. patent application Ser. No. 10/855,867, entitled SYSTEM AND METHOD FOR INITIALIZING FINANCIAL PRESENTATION INSTRUMENTS, filed on May 26, 2004, which is incorporated by reference in its entirety for any and all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

FIELD OF THE INVENTION

The present invention relates, in general, to coupons and, more particularly, to dynamically generating coupons associated with a presentation instrument.

BACKGROUND

Traditionally, a manufacturer will distribute a coupon associated with a product to various customers and/or distributors. Such coupons may be distributed using a newspaper or a mailer. A customer receives the coupon and decides to purchase the corresponding product. Accordingly, the customer then goes to a merchant's store, retrieves the product, and brings both the product and the coupon to a cashier. The cashier checks the coupon against the product and, based on the coupon and the product matching, the customer can pay a reduced amount for the product.

At this point, the merchant is not responsible for receiving a reimbursement from the manufacturer for the discounted amount. The merchant must send the used coupons to a clearinghouse, which then sends a request to the manufacturer for payment. After processing and verification, the manufacturer will send payment to the merchant. This process can take many weeks, even months to complete, delaying payment to merchants. In addition, this process is prone to fraud as well as mistakes. Hence, there is a need for improved methods and systems in the art.

BRIEF SUMMARY

Embodiments of the present invention are directed to a method of dynamic coupon generation. The method may include associating a coupon value with a manufacturer's offer onto a presentation instrument. The presentation instrument may include a barcode to store terms of the manufacturer's offer and a storage device to store coupon value information. The method may further include distributing the presentation instrument to a customer, scanning the barcode to verify the terms of the offer have been fulfilled, and presenting the presentation instrument to a merchant to access the coupon value information stored on the storage device. Furthermore, the method may receive funds in the amount of the coupon value from the manufacturer, and transfer the received funds to the merchant.

According to further embodiments, a system for dynamic coupon generation is described. The system may include a stored value host which is configured to associate a coupon value with a manufacturer's offer onto a presentation instrument. The presentation instrument may include a barcode to store terms of the manufacturer's offer and a storage device to store the coupon value information. The system may further include a coupon processing host coupled with the stored value host which is configured to distribute the presentation instrument.

The system may further include a barcode scanning device coupled with the coupon processing host which is configured to scan the barcode to verify that the terms of the offer have been fulfilled. The system may include a point of sale device, at a merchant location, which coupled with the stored value host and configured to receive a swipe of the presentation instrument to access the coupon value information stored on the presentation instrument's storage device, and transmit the information to the stored value host. The stored value host may be further configured to receive funds in the amount of the coupon value from the manufacturer, and transfer the received funds to the merchant.

In an alternative embodiment, a machine-readable medium is described. The machine-readable medium may include instructions for associating a coupon value with a manufacturer's offer onto a presentation instrument. The presentation instrument may include a barcode to store terms of the manufacturer's offer and a storage device to store coupon value information. The machine-readable medium may further include instructions for distributing the presentation instrument to a customer, scanning the barcode to verify the terms of the offer have been fulfilled, and presenting the presentation instrument to a merchant to access the coupon value information stored on the storage device. Furthermore, in response to accessing the coupon value information stored on the storage device, the machine-readable medium may include instructions for receiving funds in the amount of the coupon value from the manufacturer, and transferring the received funds to the merchant.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
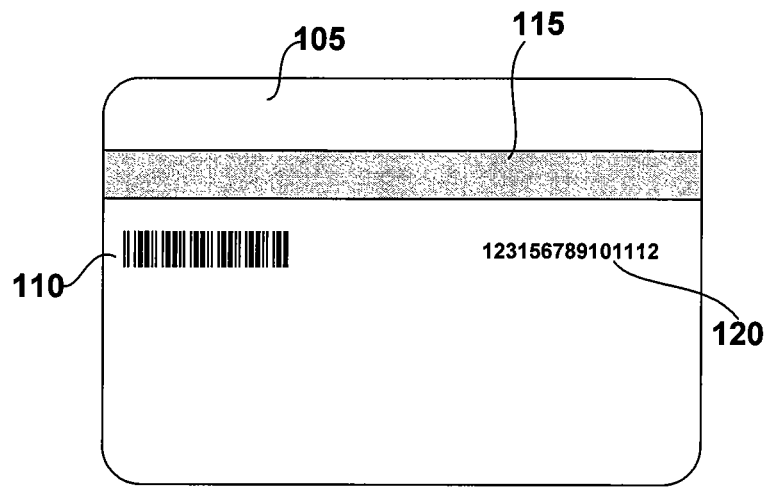
FIG. 1A is a block diagram illustrating a presentation instrument according to embodiments of the present invention.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to dynamic coupon generation. In one embodiment, such coupons may be generated using a presentation instrument which can have stored value associated with the instrument for the amount of the coupon. For example, a manufacturer has a product (e.g., a cleaning product) that they would like to promote. As part of the promotion, the manufacturer may distribute presentation instruments with an associated value of, for example, $0.40 off of the cleaning product. A customer that receives the presentation instrument can then simply take the presentation instrument to a merchant who carries the cleaning product and purchase the product at the discounted price.

In one embodiment, the presentation instrument may include, for example, a barcode and a magnetic stripe. As such, when the customer is checking out, the cashier can scan the barcode to verify that the product purchased matched the coupon offer. In one embodiment, the barcode on the presentation instrument may match the barcode on the product associated with the coupon offer (i.e., the cleaning product). The customer may then be prompted to swipe the magnetic stripe at, for example, a point of sale (POS) device. The funds on the presentation instrument are verified, and the customer is sold the product at the discounted price (in this example at $0.40 off).

Subsequently, a request for payment of the discounted amount may then be sent from the merchant to the stored value host. The stored value host may then receive the appropriate funding amount (possibly less a fee) from the manufacturer. The funds may then be transferred to the merchant. Hence, the merchant is able to receive payment much faster and the manufacturer does not need to hassle with receiving and verifying paper coupons because of the stored value host.

In a further embodiment, the presentation instrument may include instructions for registering the coupon. An incentive for registration may be an increase of the $0.40 off coupon to a $1.00 off coupon. The customer may be prompted to provide the manufacturer with personal information during the registration process. The manufacturer can benefit from this personal information because the manufacturer now receives actual redemption data. The manufacturer also knows demographic information for the customers purchasing their products. Once the customer has registered, the customer can then redeem the higher value coupon.

Turning now to FIG. 1A which illustrates a presentation instrument 105 according to one embodiment of the present invention. In one embodiment, a presentation instrument may be a stored value card, a prepaid credit card, a gift card, etc. Alternatively, a presentation instrument may be embedded in a cellular telephone device, a handheld device, a mobile device, etc. In addition, the presentation instrument may be an electronic instrument, a virtual instrument, and e-wallet, etc. Essentially, the presentation instrument may be any instrument which has the ability to store a value and retrieve that value.

In one embodiment, the presentation instrument may include a barcode 110 and/or a magnetic stripe 115. Barcode 110 may be a coupon barcode which may include information about the coupon offer. For example, the barcode may include information about the product which the coupon is associated with, the discount type, the discount amount, an expiration date(s), redemption restrictions, etc. Alternatively, the presentation instrument may use a different storage mechanism. For example, instead of using a barcode to store coupon information, a magnetic stripe, an RF transmitter, a smart chip, a solid state storage device, etc., may be used.

In one embodiment, magnetic stripe 115 may be used to store information about the funds associated with redemption of the coupon. For example, in the example above, the redemption value of the coupon was $0.40; as such the magnetic stripe would store an identifier with would identify a stored value account or prepaid credit account in which the funds may be stored. Accordingly, upon redemption of the coupon, the account identity is verified with, for example, a stored value host, and upon verification that the account is valid the funds would be transferred.

Alternatively, the magnetic stripe may be replaced with a smart chip, a flash memory, a solid state memory, an RF transmitter, etc. Any one of these storage devices may be used to store the account identifier as well as other account information. Alternatively, as discussed above, the account information may be stored in a portable or cellular device. For example, the customer may connect the portable device to a computer system (via a universal serial bus (USB) connection or the like), and download an on-line coupon to their portable device. The downloaded coupon may be redeemed at an online retailer, for example, or other merchant. Alternatively, the customer may transfer the coupon to their portable device via email, text messaging, etc.

In a further embodiment, presentation instrument 105 may include an account number 120. Account number 120 may be the account identifier described above or may be an additional or alternative number. For example, account number 120 may be a prepaid credit card account number which the customer may use to redeem the coupon value from the card. As such, presentation instrument 105 may also include an expiration date (not shown).

Figure 1B:
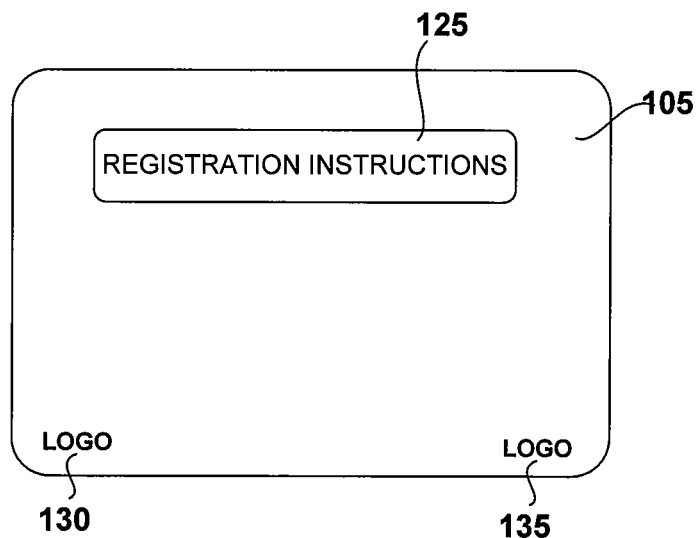
FIG. 1B is a block diagram further illustrating the presentation instrument according to embodiments of the present invention.

Alternatively, account number 120 may be a unique identifier that can identify, for example, the specific coupon offer, the account information, or may be used in a registration process. FIG. 1B which further illustrates presentation instrument 105 includes registration instructions 125. In one embodiment, registration instructions 125 may be used to instruct the customer as to how to register the presentation instrument. For example, registration instructions 125 may include a universal resource locator (URL) for the customer to go to use a web browser. Once the customer accesses the website associated with the URL, the website may provide the customer with further registration instructions. The customer may be asked to provide account number 120 in order to identify presentation instrument 105.

Alternatively, or in addition to the URL, registration instructions 125 may include a telephone number for the customer to call. The customer may call in to an interactive voice recognition (IVR) system, a call center, or the like, and be asked to provide account number 120 or other identification information. Additionally, during the registration process the customer may be asked to provide personal information in order to be able to complete the registration process. For example, the website may provide various fields for the customer to fill in (e.g., name, address, telephone number(s), date of birth, ethnic background, occupation, income level, interests, etc.). Similarly, the IVR system or call center may ask the customer such questions during the registration process.

Presentation instrument 105 may further include a logo 130 and a logo 135. Logo 130 may include a financial network's logo (e.g., the STAR™ network logo, the VISA™ logo, a banking network logo, etc.). In one embodiment, logo 135 may be a product logo (e.g., the cleaning product's logo) or may be a company logo (e.g., manufacturer X's logo). Logo 135 may cover a only a portion of presentation instrument 105 or alternatively may completely cover presentation instrument 105 (i.e., as a background image).

Figure 2:
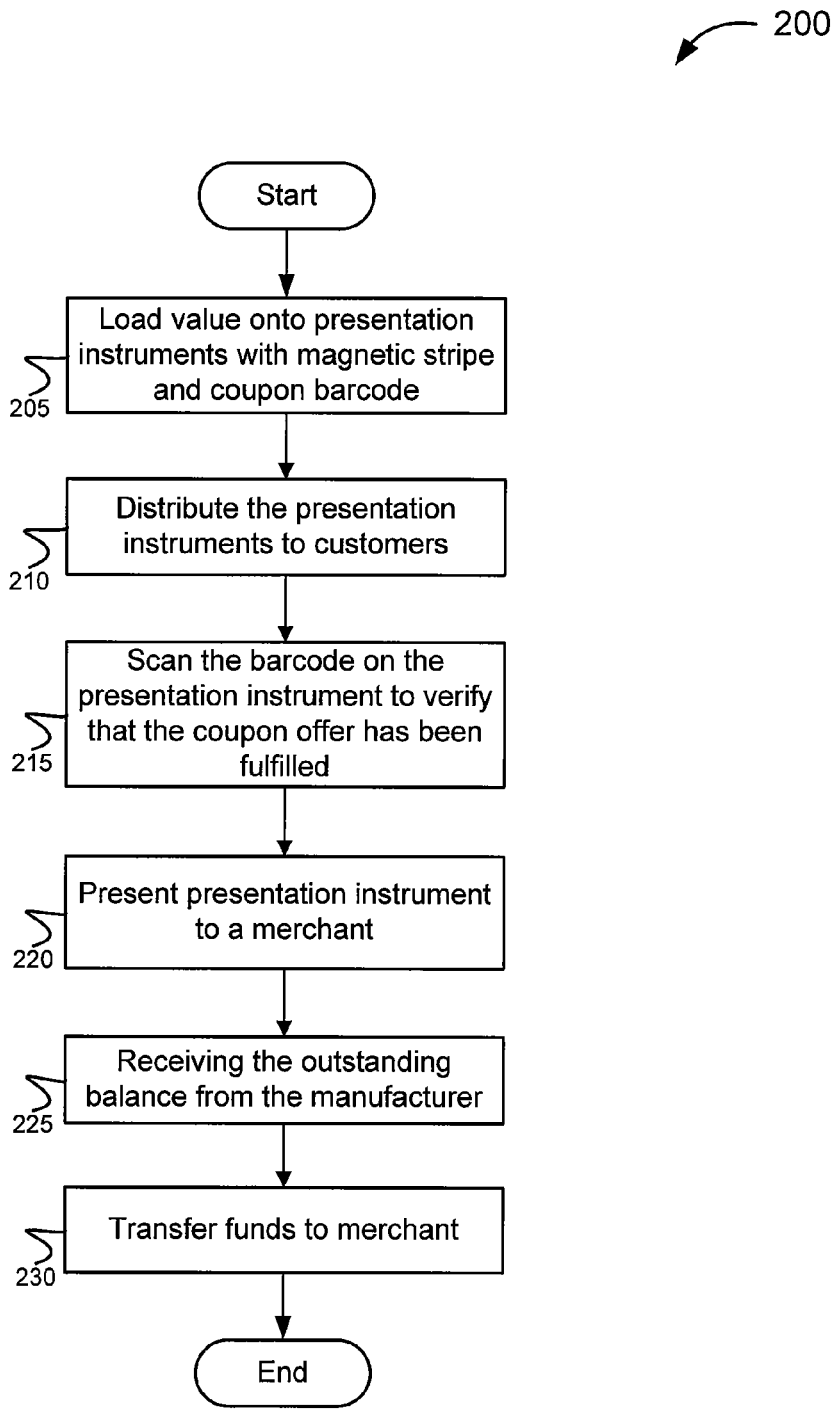
FIG. 2 is a flow diagram illustrating dynamic coupon generation according to one embodiment of the present invention.

Turning now to FIG. 2 which illustrates a method 200 of dynamic coupon generation according to aspects of the present invention. In one embodiment, method 200 may be implemented in conjunction with the presentation instrument in FIGS. 1A and 1B. At process block 205, a coupon value may be associated with a presentation instrument (e.g., presentation instrument 105). In one embodiment, the presentation instrument may include a storage device (e.g., a magnetic stripe) and a barcode. As such, the coupon value may be associated with and stored by the magnetic stripe and the coupon terms may be stored in the barcode. Furthermore, the coupon value may be inactive and require some sort of registration and/or activation in order for the coupon value to be available for use.

At process block 210, the presentation instruments may be distributed to customers. The distribution may be through a mailing, a newspaper, a magazine, through retail (and other merchant) establishments, online presentation instruments may be distributed via email, website pop-ups or links, text messages, etc. For example, a customer may be browsing manufacturer X's website and receive a popup or click on a link that advertises "$0.40 off A cleaning product! and register now for $1.00 off the cleaning product." The customer would then click the advertisement and, for example, may be emailed the discount, mailed a presentation instrument, given a phone number to call, etc. Hence, manufacturers are afforded many different ways in which they can distribute coupons which are in some way associated with a presentation instrument and a stored value account.

Furthermore, after a customer receives the coupon presentation instrument (or similar instrument) the customer may wish to purchase the product. At process block 215, the barcode on the presentation instrument may be scanned at the time of purchase. In one embodiment, the scanning of the barcode may be performed in order to verify that the terms of the coupon offer have been met. For example, the coupon offer may be "buy 1 box of a cleaning product and get 1 box free." As such, if the customer has only purchased 1 box of the cleaning product, the coupon would be ineffective and the terms of the coupon would not have been met. Hence, by scanning the barcode, the coupon offer is able to be verified.

Upon verification of the coupon offer's terms, the customer may then present the presentation instrument to the merchant (process block 220). For example, when the customer is ready to present payment they may first be prompted at, for example a point of sale (POS) device, to swipe the magnetic stripe of the coupon presentation instrument. Alternatively, the customer may be asked to enter an identifier associated with the presentation instrument; nonetheless, the customer would be prompted to provide some identification of the coupon presentation instrument.

In one embodiment, upon receipt of the identifying information a lookup in a database of accounts may be preformed. The lookup may check the database to determine if the account is a valid account. If the account is valid, then funds in the amount of the coupon may be earmarked, or the value of the coupon amount may be retrieved. Alternatively, the account may be debited for the amount of the coupon. In a further embodiment, multiple earmarks or other such designations may be batched together and a single payment request may be transmitted to the manufacturer.

At process block 225, funds may be received from the manufacturer of the product for which the coupon is associated. In one embodiment, the manufacturer may transfer the funds using money transfer, EFT, an ACH transfer, a check, etc. Alternatively, the manufacturer may transfer the funds directly to the merchant, additionally, the merchant may send the payment request to the manufacturer.

It should be noted that alternatively the coupon offer may be for a manufacturer, in general (e.g., manufacturer X's coupon offer), and not just an individual product. Furthermore, the presentation instrument may be refillable. For example, once the initial coupon offer has been used or has expired, the manufacturer may re-associate a new offer or offers with the instrument. As such, the presentation instrument can be dynamically associated with different coupon offers. Hence, for example, a manufacturer X's presentation instrument may initially have a cleaning product coupon offer, a hygiene product coupon offer, and then general manufacturer X's coupon offer, etc.

In one embodiment, the customer may receive messages and/or reminders regarding their coupon presentation instrument (e.g., via email, text messages, mail, voicemail, etc.). Such a message may remind the customer of an approaching expiration date, or may notify the customer of a new offer now available with their instrument. Furthermore, based on the customer's usage of the instrument to redeem the coupon offers, loyalty offers may be generated in connection with the presentation instrument. For example, if the customer consistently uses the coupon associated with the instrument for 3 months in a row, the customer may receive, for example, an additional $1.00 coupon. Alternatively, based on the customer purchasing history, it may be determined that the customer always purchases bath tissue once per month. Therefore, the customer may be offered a coupon for the bath tissue on the presentation instrument. Accordingly, the coupon offers associated with the presentation instrument may be customized for a customer's individual needs, and then coupons may be dynamically associated with the instrument.

Referring back to process block 225, the funds may be received from the manufacturer in the amount of the coupon offer. In addition, the coupon offer amount may be received with an additional service processing fee. Alternatively, the manufacturer may have, prior to distributing the presentation instruments, authorized, for example, a stored value host to pay out the coupon discount amounts upon redemption.

At process block 230, the received funds may now be transferred to the merchant in which the product receiving the coupon discount has been purchased. In one embodiment, the merchant may receive an electronic funds transfer (EFT) for the amount of the discount. In the alternative, the merchant may receive a batch funds transfer for all of the coupons used in a given day, week, etc. Hence, the merchant is able to receive the funds to cover the coupon discount at a much faster rate than any traditional method.

Figure 3:
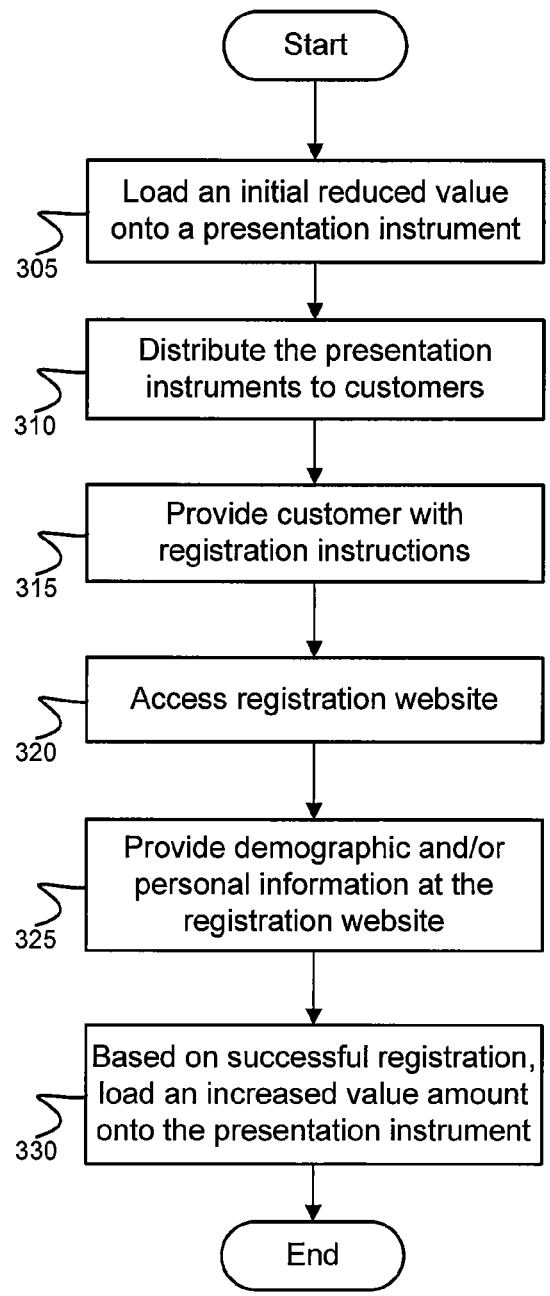
FIG. 3 is a flow diagram illustrating dynamic coupon registration according to one embodiment of the present invention.

Referring to FIG. 3 which illustrates a method 300 of dynamic coupon registration according to aspects of the present invention. Method 300 may be integrated with the processes in method 200 from FIG. 2, or method 300 may work independently from method 200 in FIG. 2. At process block 305, the presentation instrument may have any initial coupon amount associated with it. For example, referring back to the earlier example above, the initial coupon offer may be $0.40 off a cleaning product. At process block 310, the presentation instruments with the initial coupon value may be distributed to various customers.

At process block 315, as discussed above, the customer may be provided with registration instructions. Such instructions may include, for example, a telephone number to contact, a URL to access, a list of steps to complete the registration process, etc. At process block 320, the customer may access a website to initiate the registration process. Nonetheless, other registration processes may be used. The customer may further be provided with a default username and password, or alternatively the customer may be prompted at the website to provide a username and password.

Once the customer has access to the website and/or logged in or set up an account (i.e., a username and password), the customer may then be prompted to provide personal information (process block 325). In one embodiment, such personal information may include the customer's name, email address(es), address(es), phone number(s), date of birth, ethnicity, occupation, salary, number of persons and ages of persons in their household, interests, hobbies, product interests, etc. This information may be stored by the product manufacturer for marketing and other such purposes, thus providing the manufacturer with important information about actual consumers of their products.

In a further embodiment, based on successful registration of the presentation instrument associated with the coupon offer, the manufacturer may authorize an increase to the coupon offer amount to be associated with the presentation instrument (process block 330). As such, the initial offer of $0.40 off of a clearing product may be increased to $1.00 off. Therefore, the customer is provided with an incentive to register the presentation instrument and the manufacturer has the incentive of receiving actual customer data. In addition, the manufacturer now has the ability to contact the customer in order to send the customer promotional offers, surveys, and additional coupon offers to be associated with the presentation instrument.

Figure 4:
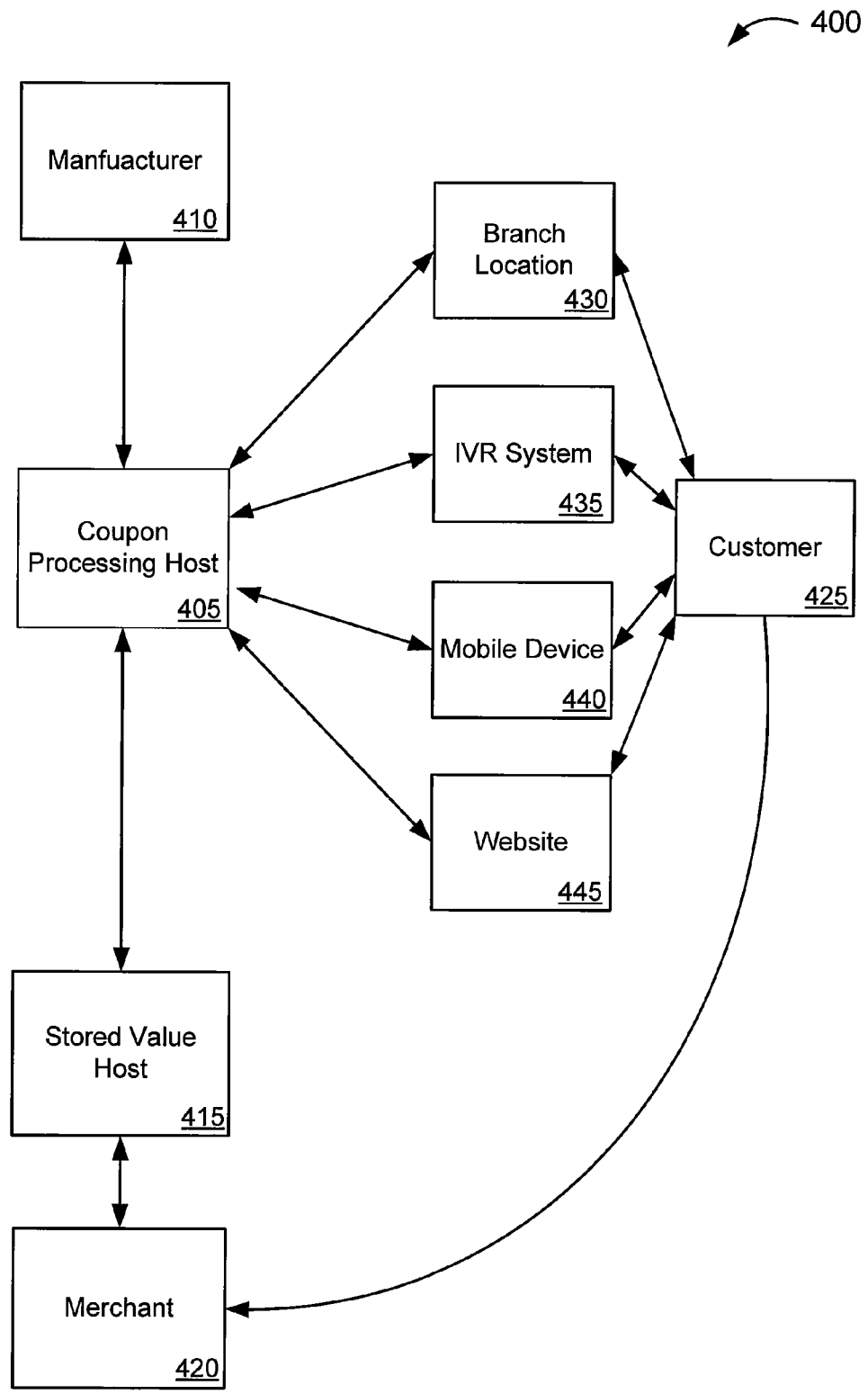
FIG. 4 is a block diagram illustrating a system for dynamically generating and/or registering coupons according to one embodiment of the present invention.

FIG. 4 illustrates a system 400 for dynamically generating coupons according to aspects of the present invention. In one embodiment, system 400 may include a coupon processing host 405 coupled with a manufacturer 410. Coupon processing host 405 may be configured to manage the distribution and processing of the various coupons associated with the presentation instruments. For example, manufacturer 410 may provide coupon processing host 405 with details and/or terms for a new coupon offer they wish to distribute. Accordingly, based on such details and terms, coupon processing host may generate a number of presentation instruments for distribution.

In a further embodiment, system 400 may include a stored value host 415 coupled to a coupon processing host 405. Coupon processing host 405 may transmit a request to stored value host 415 to associate a coupon value with the generated presentation instruments. In one embodiment, stored value host 415 may assign an account number to each of the presentation instruments along with an assigned value. In one embodiment, the account number would be a unique identifier used to identify each of the presentation instruments. Furthermore, the account number could then be used to draft the funds from stored value host 415 upon redemption of the coupon offer.

System 400 may further include a merchant 420 and a customer 425. In one embodiment, customer 425 may access merchant 420 either over the Internet, on the phone, or at a store location. Customer 425 may then purchase the product for which the coupon is associated. Upon receipt of the presentation instrument (e.g., by swiping the instrument at a POS device, by providing the account identity from the instrument at a website, etc.), merchant 420 may contact stored value host 415 to receive the funds in the amount of the coupon offer. In one embodiment, merchant 420 may provide stored value host 415 with the account identifier and the amount of the discount.

In one embodiment, stored value host 415 may verify the account information and the discount amount. In one embodiment, stored value host 415 may be a Value Link™ host; however, other hosts may be used. Upon verification, stored value host 415 may transfer the funds to merchant 420. Alternatively, stored value host 415 may earmark funds in the discount amount, and then transmit a payment request to manufacturer 410. In one embodiment, stored value host 415 may collect a number of earmarks for a given period of time (e.g., a day, a week, a month, etc.) and send a payment request to manufacturer 410 for the entire amount. Manufacturer 410 may then transfer the funds to stored value host 415 or may alternatively transfer the funds directly to merchant 420. Either way, once the coupon discount amount has been redeemed, stored value host 415 may then notify coupon processing host 405 that the coupon has been redeemed. Accordingly, merchant 420 is paid for the discount in a timely manner and manufacturer 410 is made aware of coupon redemptions in a timely manner.

In another embodiment, system 400 may further include a branch office 430, an IVR system 435, a mobile device 440, and a website 445. The distributed presentation instruments may include registration instructions. As such, customer 425 may be instructed to go in to branch office 430, call in to IVR system 435, instant message or text message from mobile device 440, or logon to website 445 in order to register their presentation instrument. In one embodiment, upon registration of a presentation instrument, coupon processing host 405 may be notified. Subsequently, coupon processing host 405 may then notify manufacturer 410 and provide manufacturer 410 with the registration information about customer 425.

Figure 5:
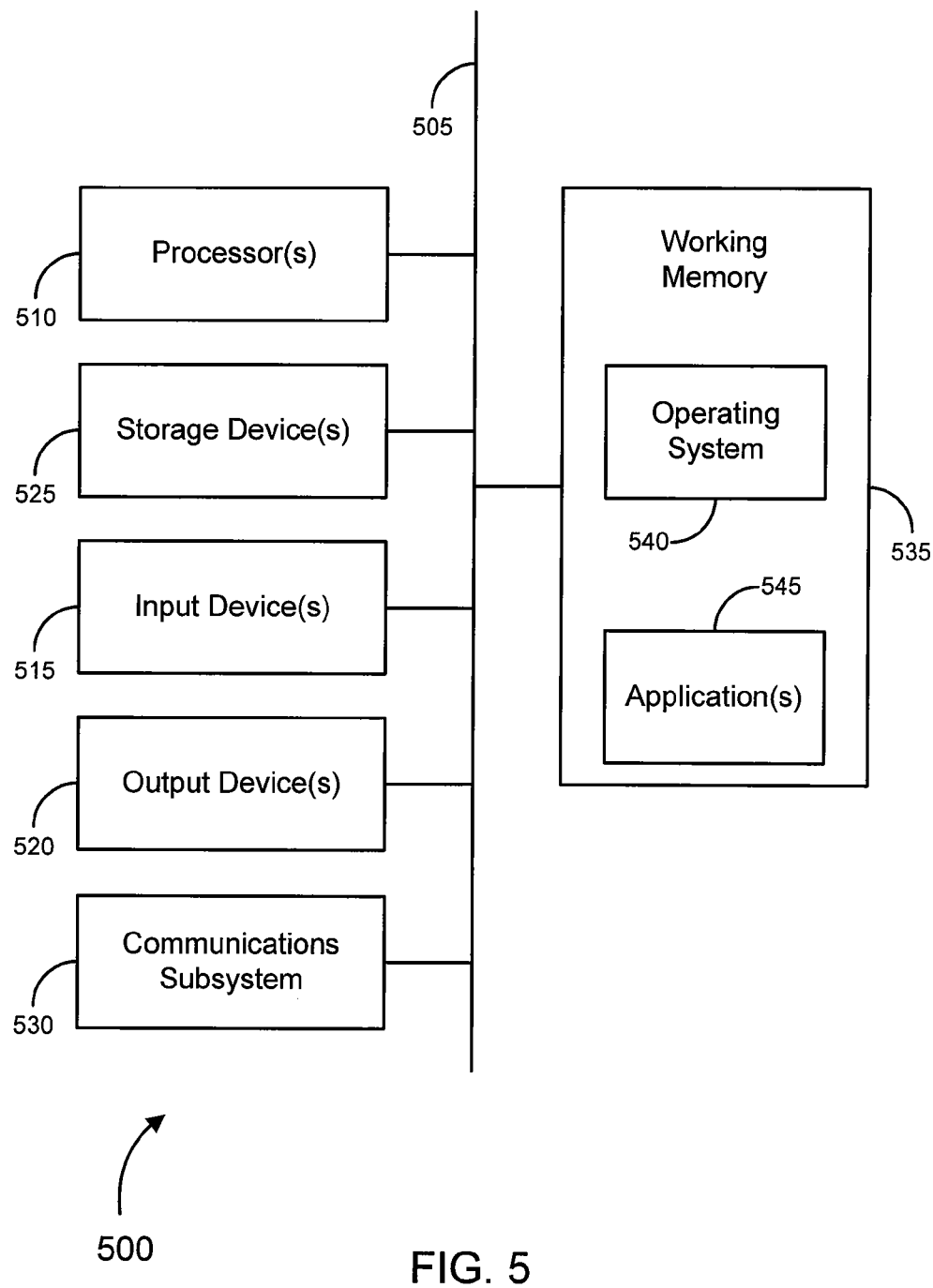
FIG. 5 is a generalized schematic diagram illustrating a computer system, in accordance with various embodiments of the invention.

Turing now to FIG. 5 which provides a schematic illustration of one embodiment of a computer system 500 that can perform the methods of the invention, as described herein, and/or can function, for example, as any part of coupon processing host 405 in FIG. 4. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
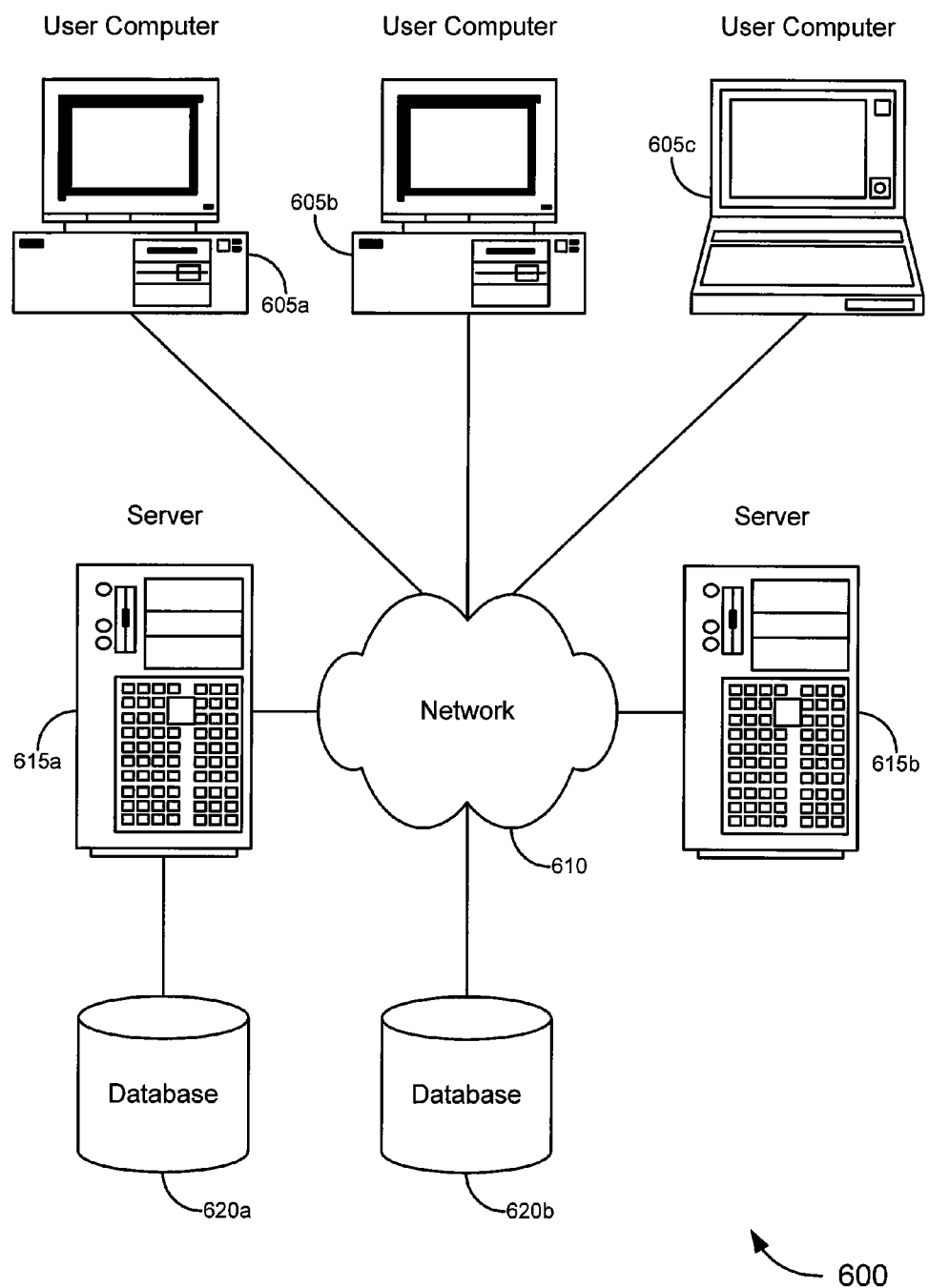
FIG. 6 is a block diagram illustrating a networked system of computers, which can be used in accordance with various embodiments of the invention.

A set of embodiments comprises systems for implementing staged configurator modeling. In one embodiment, user computers 205 and/or servers 215 may be implemented as computer system 500 in FIG. 5. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 605 and/or another server 615. In some embodiments, an application server can create web pages dynamically for displaying the information in accordance with embodiments of the invention, such as information displayed website 340 in FIG. 3. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as the database can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for dynamic coupon generation, the system comprising:
    at least one memory device having a set of instructions stored thereon; and
    at least one processor communicatively coupled with the at least one memory device, wherein the set of instructions cause the processor to, in association with a tangible presentation instrument having a tangible barcode and a tangible magnetic stripe having different information stored thereon:
    associate the tangible barcode of the tangible presentation instrument with information about a manufacturer's coupon offer that has an expiration date;
    encode the tangible magnetic stripe of the tangible presentation instrument with information about an account from which funds for the manufacturer's coupon offer will be received;
    distribute the tangible presentation instrument to a customer;
    present the customer with registration instructions associated with the tangible presentation instrument, wherein the registration instructions are disposed on a face of the tangible presentation instrument;
    receive a registration request for the tangible presentation instrument, wherein the registration request includes at least one of the customer's demographic information, the customer's personal information, the customer's spending habits, and survey information from the customer;
    based on the received registration request, increase a particular coupon value associated with the tangible presentation instrument;
    transmit a particular message to the customer selected from the group consisting of: a message notifying the customer of a coupon offer expiration date when approaching; a message notifying the customer of a new coupon offer when available for redemption with the tangible presentation instrument; and a message notifying the customer of a loyalty offer when available, the loyalty offer based on the customer's usage of the tangible presentation instrument;
    receive coupon offer information obtained by scanning the tangible barcode to verify fulfillment of terms of the manufacturer's coupon offer;
    receive coupon offer account information from a merchant, wherein the coupon offer account information is read from the tangible magnetic stripe;
    coordinate the reception of funds in an amount of the coupon value from the manufacturer;
    transfer the received funds to the merchant;
    track coupon redemption history associated with the tangible presentation instrument;
    generate additional offers specific to the tangible presentation instrument based on the customer's coupon redemption history; and
    associate the additional offers with the tangible presentation instrument.

2. The system of claim 1, wherein the registration request is received via at least one of a website, an interactive voice recognition (IVR) system, a call center, and branch office.

3. The system of claim 1, wherein the presentation instrument comprises at least one of a form factor card, a stored value card, a prepaid credit card, and a mobile device.

4. The system of claim 1, wherein the set of instructions further cause the processor to collect a fee for transferring the received funds from the manufacturer to the merchant.

5. The system of claim 1, wherein the messages are transmitted using at least one of a text message and a voicemail message.

6. The system of claim 1, wherein the presentation instrument is reusable by the customer by associating the presentation instrument with an additional coupon value.

7. The system of claim 1, wherein the merchant is an on-line merchant.

8. A system for dynamic coupon generation, the system comprising:
    a stored value host configured to associate a coupon value with a manufacturer's offer onto a presentation instrument, wherein the presentation instrument includes a barcode and a magnetic stripe having different information stored thereon, the barcode having information about a manufacturer's coupon offer associated therewith and the magnetic stripe having information about an account associated with the manufacturer's coupon offer encoded thereon;
    a coupon processing host coupled with the stored value host configured to distribute the presentation instrument, and to transmit a particular message to a mobile device of a customer selected from the group consisting of: a message notifying the customer of a coupon offer expiration date when approaching; a message notifying the customer of a new coupon offer when available for redemption with the presentation instrument; and a message notifying the customer of a loyalty offer when available, the loyalty offer based on the customer's usage of the presentation instrument;

an interface coupled with the coupon processing host configured to receive input associated with a registration request for the presentation instrument, and transmit the registration request to the coupon processing host, wherein the registration request includes at least one of the customer's demographic information, the customer's personal information, the customer's spending habits, and survey information from the customer;

a bar code scanning device coupled with the coupon processing host and configured to scan the bar code to receive coupon offer information to verify fulfillment of terms of the manufacturer's coupon offer; and a point of sale device, at a location of a merchant, coupled with the stored value host and configured to receive a swipe of the presentation instrument to receive information about the account and transmit the information to the stored value host;

wherein the coupon processing host is further configured to receive the registration request, verify the request, and upon verification, transmit the registration request to the stored value host; and wherein the stored value host is further configured to, based on the received registration request, increase the coupon value associated with the presentation instrument, to receive funds in an amount corresponding to multiples of the coupon value from the manufacturer when requested and transfer the received funds to the merchant, and to track coupon redemption history associated with the presentation instrument, generate offers specific to the presentation instrument based on the customer's coupon redemption history, and associate additional offers with the presentation instrument.

9. At least one non-transitory machine-readable medium for dynamic coupon generation, having sets of instructions stored thereon which, when executed by at least one machine, cause the at least one machine to:

associate a coupon value with a manufacturer's offer onto a presentation instrument, wherein the presentation instrument includes a barcode and a magnetic stripe having different information stored thereon;

associate the barcode with information about a manufacturer's coupon offer that has an expiration date;

encode the magnetic stripe with information about an account from which funds for the manufacturer's coupon offer will be received;

effect distribution of the presentation instrument to a customer;

receive coupon offer information scanned from the barcode to verify fulfillment of terms of the manufacturer's coupon offer;

present the customer with registration instructions associated with the presentation instrument;

receive a registration request for the presentation instrument, wherein the registration request includes at least one of the customer's demographic information, the customer's personal information, the customer's spending habits, and survey information from the customer; and based on the received registration request, increase a particular coupon value associated with the presentation instrument;

transmit a particular message to the customer selected from the group consisting of: a message notifying the customer of a coupon offer expiration date when approaching; a message notifying the customer of a new coupon offer when available for redemption with the presentation instrument; and a message notifying the customer of a loyalty offer when available, the loyalty offer based on the customer's usage of the presentation instrument;

receive account information read from the magnetic stripe;

receive funds in an amount of the coupon value from the account;

transfer the received funds to a merchant;

track coupon redemption history associated with the presentation instrument;

generate additional offers specific to the presentation instrument based on the customer's coupon redemption history; and associate the additional offers with the presentation instrument.

\* \* \* \* \*